United States Patent [19]
Connor

[11] Patent Number: 5,544,737
[45] Date of Patent: Aug. 13, 1996

[54] CONVEYOR DEVICES

[76] Inventor: David Connor, #308-1230 Quayside Dr., New Westminster, British Columbia, Canada, V3M 6H1

[21] Appl. No.: 389,508

[22] Filed: Feb. 16, 1995

[51] Int. Cl.$^6$ ................................ B65G 35/00
[52] U.S. Cl. ........................ 198/615; 198/692
[58] Field of Search ............... 198/615, 678.1, 198/687.1, 692, 469.1, 482.1; 30/381, 514

[56] References Cited

U.S. PATENT DOCUMENTS

| | | | |
|---|---|---|---|
| 223,904 | 1/1880 | Gleason | 198/692 |
| 986,483 | 3/1911 | Messlin | 198/615 |
| 2,466,240 | 4/1949 | Joa | 198/615 |
| 2,937,748 | 5/1960 | Stevens | 198/692 X |
| 5,381,861 | 1/1995 | Crafton et al. | 198/643 X |

OTHER PUBLICATIONS

"On Rope", Allen Padgett and Bruce Smith, p. 187, published by National Speleological Society.

*Primary Examiner*—James R. Bidwell
*Attorney, Agent, or Firm*—Brian M. Long

[57] ABSTRACT

An easily transportable self-powered conveyor device, for use e.g. in transporting pieces of wood over rough terrain, has a drive chain and driven disc installed on a chainsaw in place of a saw chain and bar, the drive chain being in driving engagement with the driven disc. A sheave is connected to an output of a reduction gearing for rotation thereby and a rope extends around the sheave, with securing devices attached to the rope and spaced apart along the rope for temporarily securing objects to the rope for conveyance thereby as the rope is pulled by the sheave. A retaining device anchors the sheave to any suitable support, e.g. a tree.

10 Claims, 8 Drawing Sheets

5,544,737

CONVEYOR DEVICES

BACKGROUND OF THE INVENTION

1. Field of the Invention

The present invention relates conveyor devices and is useful in particular, but not exclusively, for readily transportable conveyor devices which can be employed in woodland areas for conveying, for example, split firewood, shake blocks and yellow cedar cants.

2. Description of the Related Art

In the cutting of timber, there is often a need to convey relatively small pieces of wood over very rough terrain. In the past, the collection of these pieces of wood has been carried out by manually conveying them to a truck. However, this procedure requires access by the truck to a location near that at which they are produced, which is often impossible because of the lack of access roads or sufficiently level and unobstructed terrain.

The present inventor has therefore appreciated a need for a readily transportable, self-powered conveyor device which can be carried over rough terrain to the location at which the pieces of wood are produced and which can then be readily installed between that location and a location to which the trucks can be driven for collecting them.

BRIEF SUMMARY OF THE INVENTION

According to the present invention, there is provided a conveyor device which employs a chainsaw as a source of power for the conveyor device. A drive chain and a driven disc are installed on the chainsaw, in place of the chainsaw's conventional saw chain and bar, the drive chain being in driving engagement with the driven disc. A reduction gearing has an input connected to the driven disc and an output connected to a sheave for rotating the sheave. A retainer device connected to the sheave secures the sheave to a support, for example a tree, and a rope, extends around the sheave so as to be pulled by the sheave.

In the preferred embodiment of the invention, the rope is an endless belt which runs around a pulley secured to another support, e.g. another tree.

A plurality of securing devices are attached to the rope and are spaced apart around the rope for temporarily securing objects, for example pieces of wood, to the rope for conveyance thereby.

Thus, the present conveyor device makes use of an easily transportable power source of a type, i.e. a chainsaw, which is normally readily available in timber-producing areas. The drive chain and the driven disc which are installed on the chainsaw in place of its saw chain and bar are commercially available components. The remaining components of the conveyor device can be readily and relatively inexpensively manufactured, and the conveyor device can be carried by one or more persons walking over rough terrain.

BRIEF DESCRIPTION OF THE DRAWINGS

Further features and advantages of the present invention will be more readily apparent from the following description of a preferred embodiment thereof taken in conjunction with the accompanying drawings, in which.

DESCRIPTION OF THE PREFERRED EMBODIMENT

Figure 1:
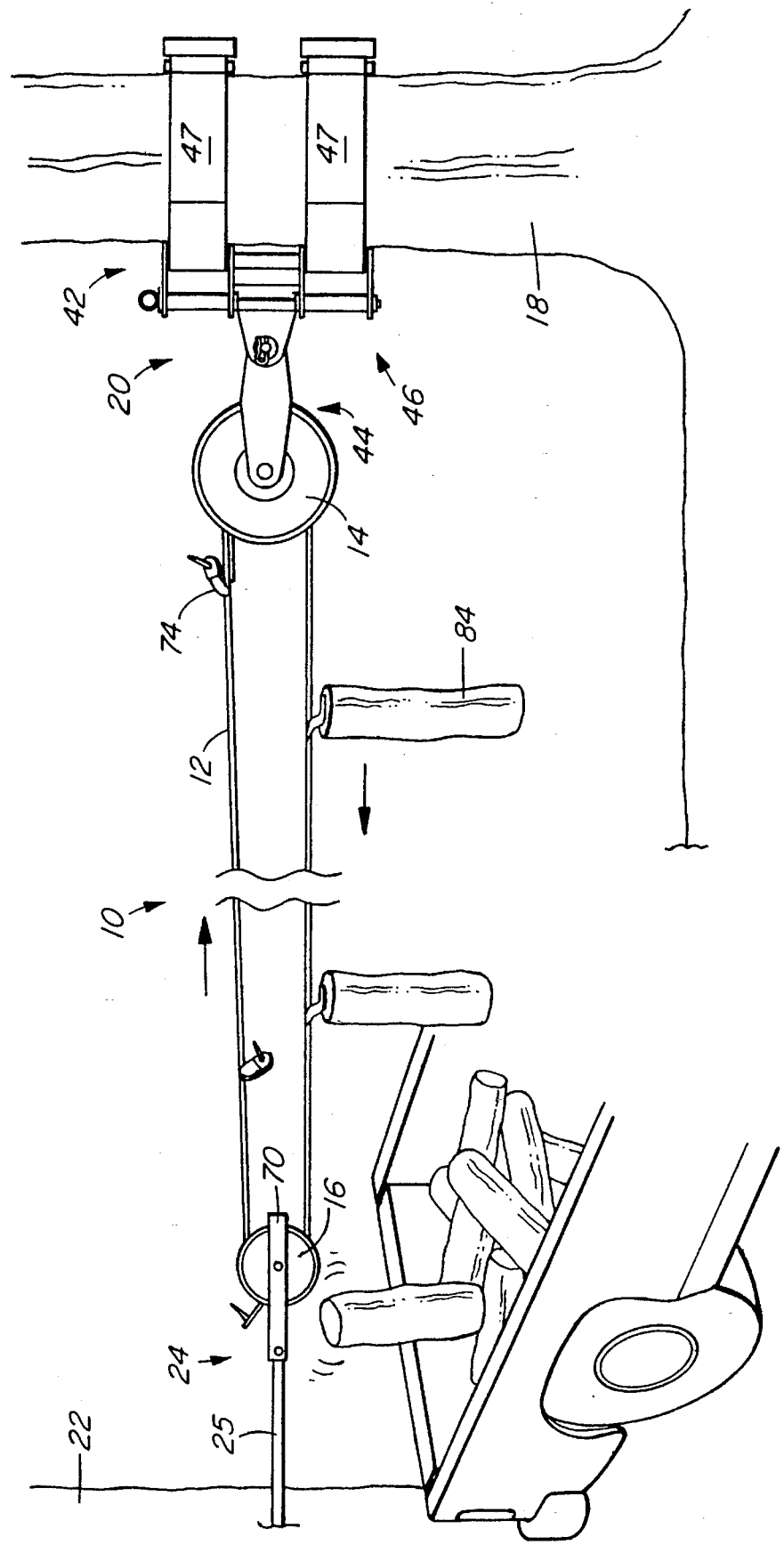
FIG. 1 shows a broken-away view in side elevation of a conveyor device embodying the present invention.

In FIG. 1, there is illustrated a conveyor device indicated generally by reference numeral 10, which has an endless member in the form of a rope 12 extending around a driven Vee-grooved sheave 14 and a freely rotatable pulley 16.

The sheave 14 is secured to a tree 18 by a first retainer device indicated generally by reference numeral 20, and the pulley 16 is secured to another tree 22 by a second retainer device indicated generally by reference numeral 24, which includes a strap 25 wrapped around the tree 22.

Figure 2:
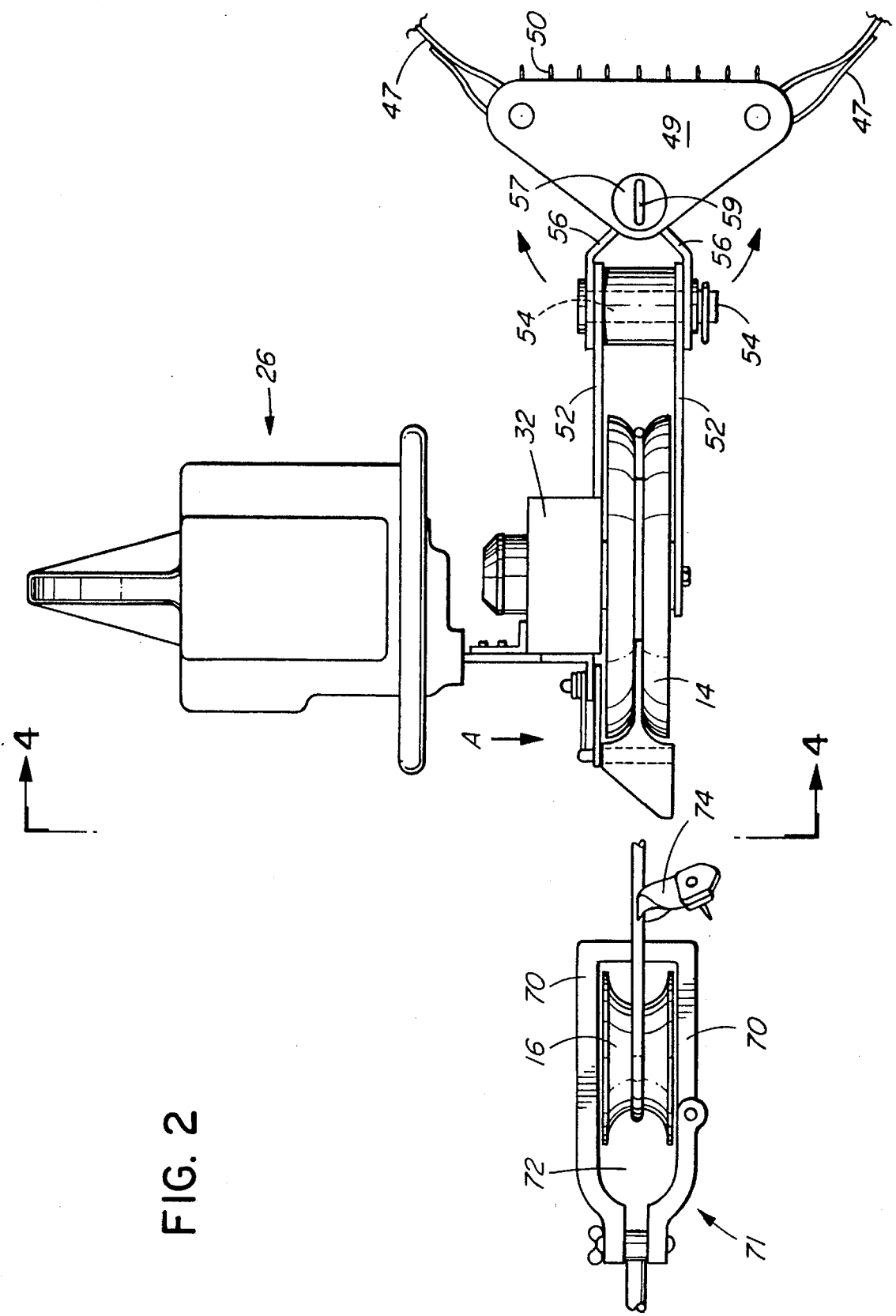
FIG. 2 shows a plan view of the conveyor device of FIG. 1.
Figure 3:
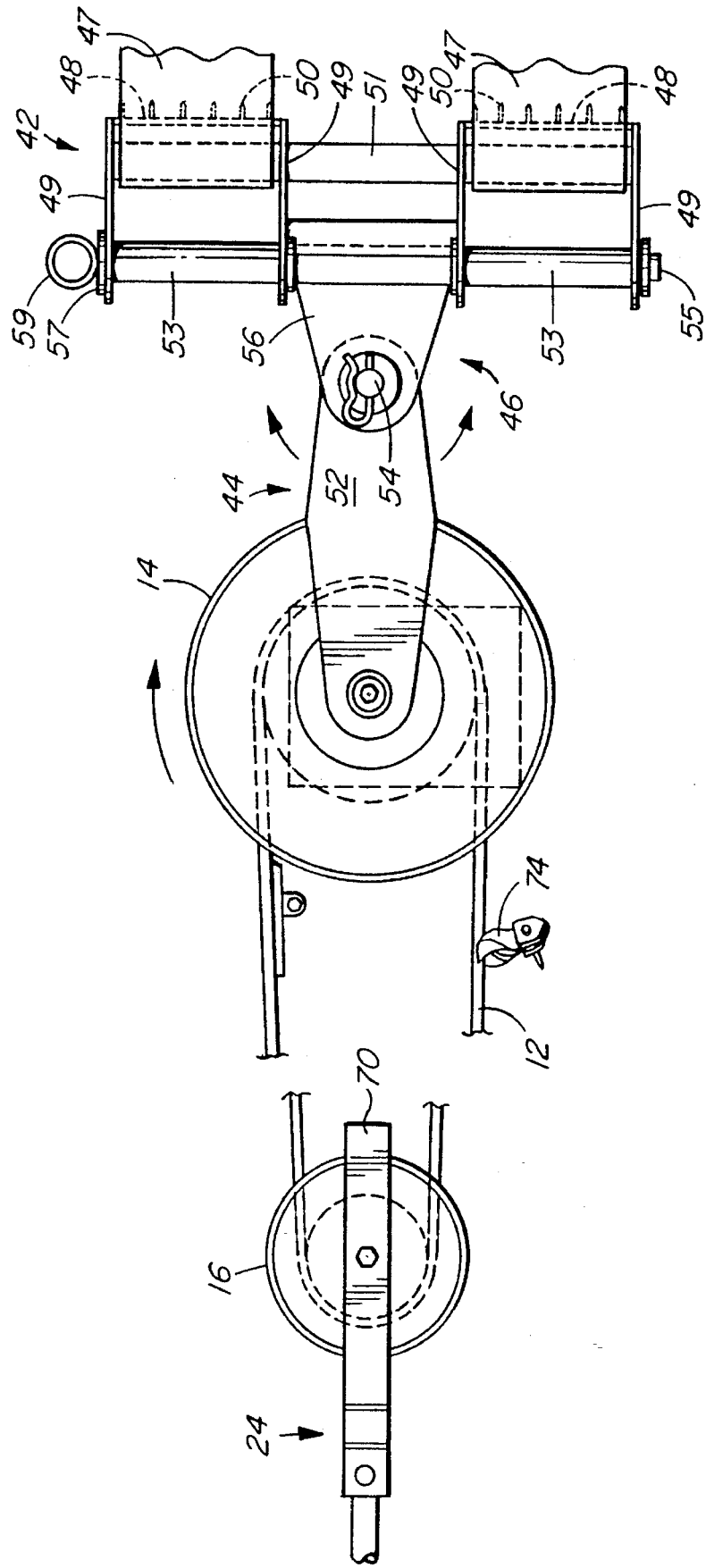
FIG. 3 shows a broken-away view in side elevation, on an enlarged scale.
Figure 4:
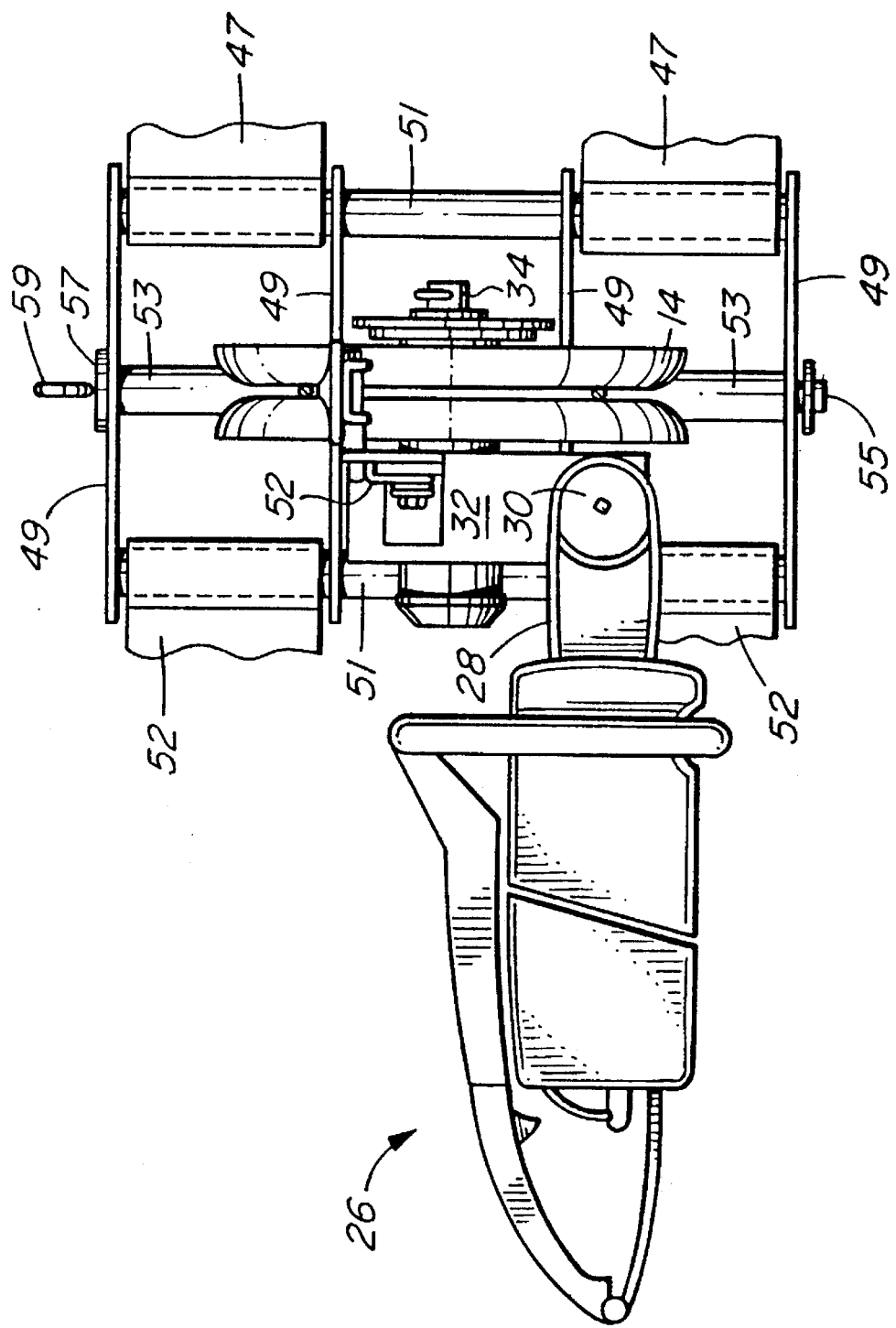
FIG. 4 shows a view taken in elevation along the line 4—4 of FIG. 2.
Figure 5:
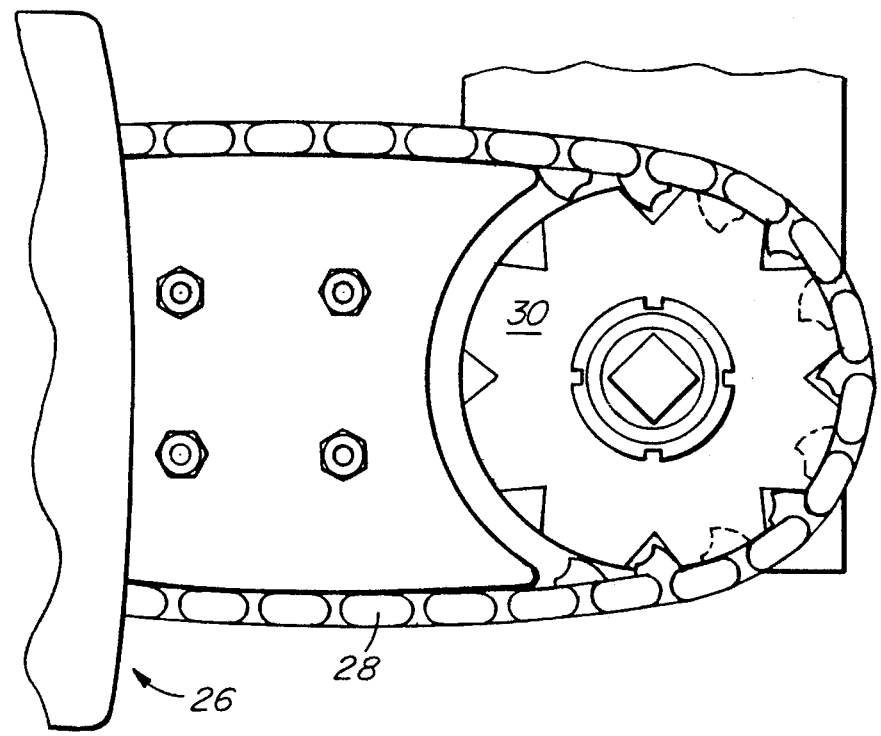
FIG. 5 shows a broken-away view in side elevation of part of a chain and associated drive disc.

The sheave 14 is driven by a chainsaw indicated generally by reference numeral 26 in FIGS. 2 and 4. For this purpose, the conventional saw chain and bar (not shown) of the chainsaw 26 are replaced by a drive chain 28 (FIG. 5) and a driven disc 30. The drive chain 28 and the driven disc 30 are commercially available components available from Atom Industries Pty., of Lilyfield, New south Wales, Australia. When the chainsaw is in operation, the drive chain 28 rotates the driven disc 30, which is connected to the input of a reduction gearing 32 (FIG. 4), the output of which is connected to a shaft 34 carrying the sheave 14. In this way, the sheave 14 is rotationally driven by the chainsaw 26.

The sheave 14 comprises a spacer disc 36 (FIG. 6) sandwiched between a pair of drive discs 38, which have divergently curved outer peripheral portions 40 for receiving the rope 12 between the drive discs 38.

Figure 6:
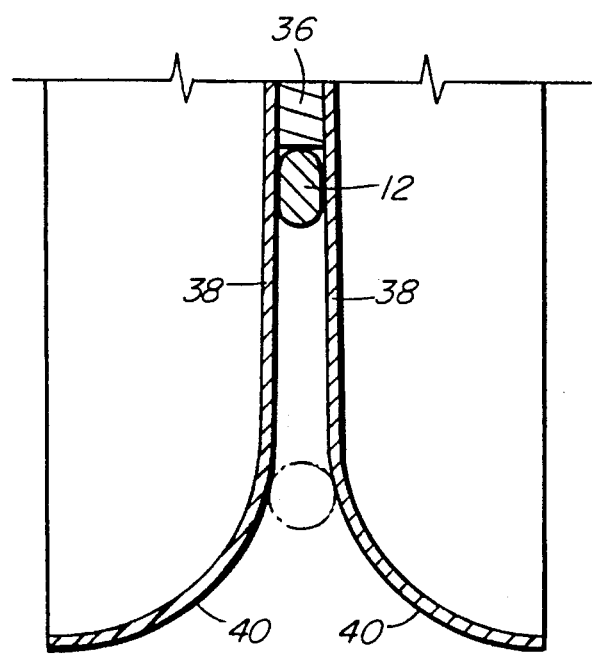
FIG. 6 shows a broken-away view taken in radial cross-section through a pulley forming part of the conveyor device of FIG. 1.

The width of the spacer disc 36 is dimensioned so that the gap between the drive discs 38 is slightly less than the normal diameter of the rope 12. Consequently, as the rope 12 is forced between the drive discs 38, the cross-sectional shape of the rope 12 changes from a circular shape, as illustrated in a dash-line in FIG. 6, to a compressed shape, as indicated in FIG. 6 by reference numeral 12. This causes the rope 12 to be securely gripped between the drive discs 38 so that the rope 12 can be frictionally driven by the sheave 14.

The rope 12 is a synthetic fibre rope having a low stretch ratio and sold under the trade mark SPECTRA 900 by Herzog Rope Company, of Vancouver, British Columbia, Canada. This type of rope has the advantage that, if broken while under tension, it will not whip back, with possible danger to a bystander.

The first retainer device 20 comprises a first part, indicated generally by reference numeral 42, by which it is secured to the tree 18, a second part 44, which carries the sheave 14, the chainsaw 26 and the reduction gearing 32, and a pivotal connection in the form of a gimbal joint 46 between the first and second parts 42 and 44.

The first part 42 comprises two plates 48 for abutment against the tree 18, with a plurality of spikes 50 projecting from each of the plates 48, the spikes 50 serving to penetrate and thereby to grip the tree 18 so as to prevent the plates 48 and, therewith, the first retainer device 20 from sliding upwardly or downwardly, or laterally, relative to the tree 18. A pair of straps 47 are secured at opposite ends to the plates 48 and are wrapped around the tree 18 so as to retain the first part 42 of the first retainer device 20 in position on the tree, in cooperation with the spikes 50. The plates 48 one each welded to a pair of horizontal triangular plates 49 which in turn are welded to two vertical tubes 51. Two further vertical tubes 53 are welded to the triangular plates 49 in alignment with one another, and a shaft 55 having at its upper end a disc-shaped collar 57 and an eye-ring 59 is inserted through the tubes 53.

The second part 44 of the first retainer device 20 comprises a pair of parallel plates 52 carrying the sheave 14 between them. The gimbal joint 46 comprises a first pivot pin 54, which has a horizontal axis of pivotation, and which provides a pivotal connection between the plates 52 and a pair of connecting members 56. The vertical shaft 55 provides a pivotal connection between the connecting members 56 and the triangular plates 49. Thus, the sheave 14 can pivot vertically and horizontally relative to the first part 42 of the retaining device 20.

The second retaining device 24 comprises a pair of parallel elongate members in the form of bars 70, which are spaced apart from one another and which carry the pulley 16 between them. The pulley 16 and the bars 70 form parts of a snatch block indicated generally by reference numeral 71. As can be seen from FIG. 2, the bars 70 project beyond the pulley 16, towards the tree 22, and they thus form between them a gap 72.

Figure 7:
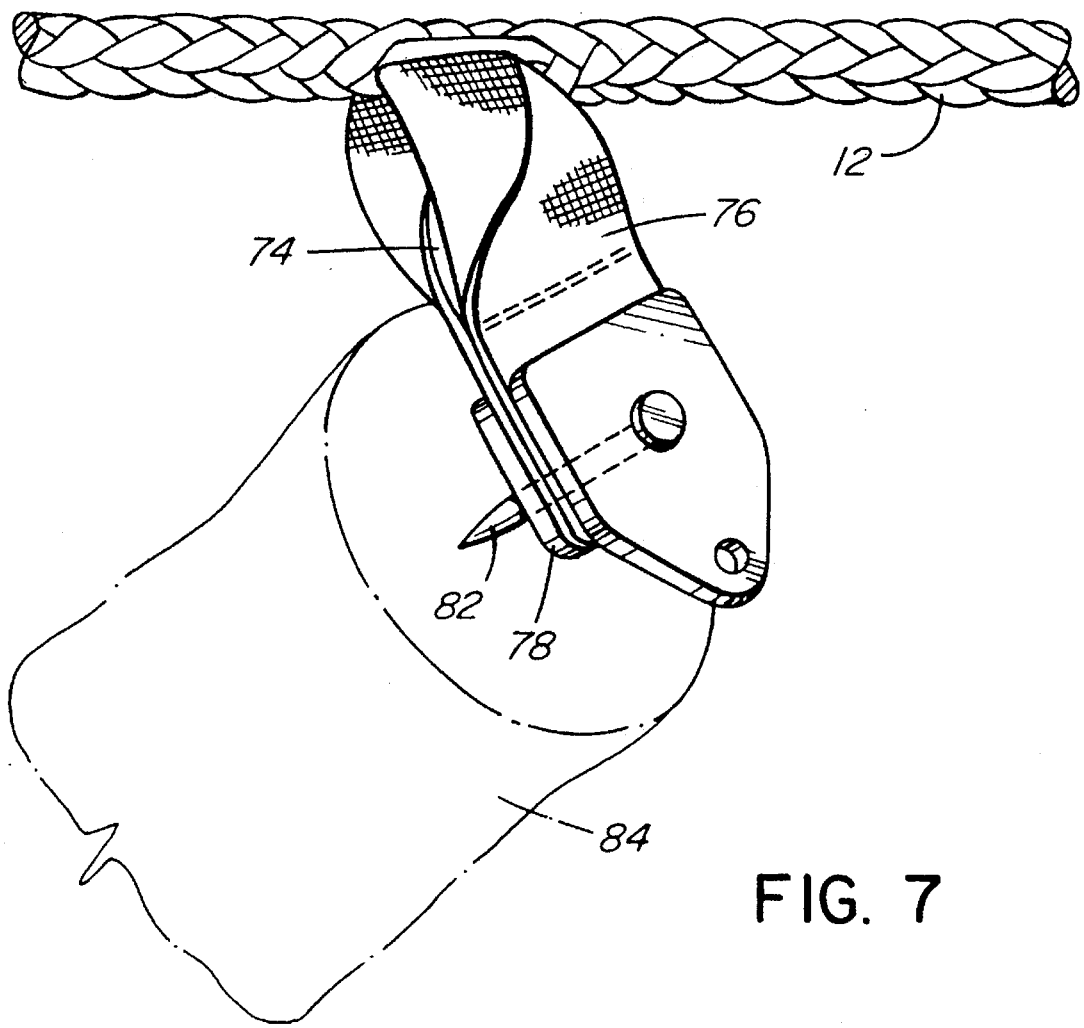
FIG. 7 shows a broken-away view in side elevation of a securing device attached to a rope forming part of the conveying device of FIG. 1.

The rope 12 is provided with a plurality of securing devices 74, which are spaced apart along the rope 12. One of these securing devices 74 is illustrated in greater detail in FIG. 7, from which it can be seen that it comprises a strap potion 76, which is inserted through the strands of the rope 12, a pair of plates 78 and 80 and a spike 82 extending through the plates 78 and 80 and the ends of the strap 76. In use, the spike 82 is driven into the end of a piece of wood 84 or other object to be conveyed. The piece of wood 84 can then be carried by the rope 12 from the sheave 14 to the pulley 16. At the pulley 16, the securing device 74 can pass through the gap 72 between the bars 70, but the piece of wood 84 is too large to pass through the gap 72 and is therefore stripped from the spike 82 by the bars 70, so that it can drop into a container, for example a truck, as shown in FIG. 1.

The strap 76 is sufficiently thin to pass between the drive discs 38 as the securing devices pass around the sheave 14.

Figure 8:
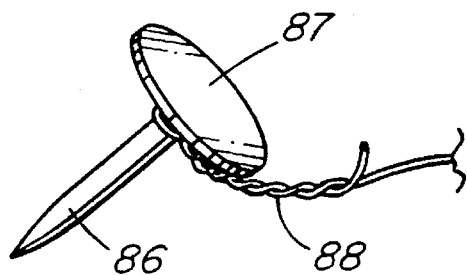
FIG. 8 shows a view in perspective of a securing spike for use as an accessory to the conveyor of FIGS. 1 through 7.

For conveying relatively a long article, e.g. a cant, a spike 86 (FIG. 8) having a flat head 87 has a wire 88 wound around the spike 86. The wire 88 can be inserted through a hole 89 in the plate 80 and wound around itself so as to secure the spike 86 to the securing device 74. The spike 86 can then be driven into one end of the long article, and a similar spike can be driven into the opposite end of the long article, to enable the article to be carried beneath the rope 12 in an orientation substantially parallel to the rope 12.

Figure 9:
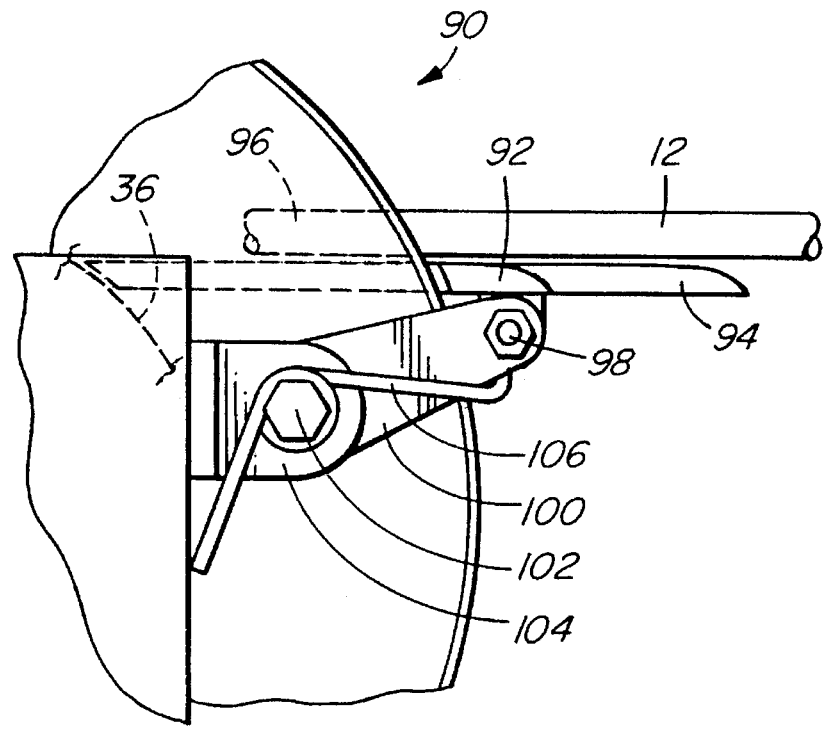
FIG. 9 shows a broken-away side view, taken in the direction of arrow A of FIG. 2, illustrating parts of a deflector device.
Figure 10:
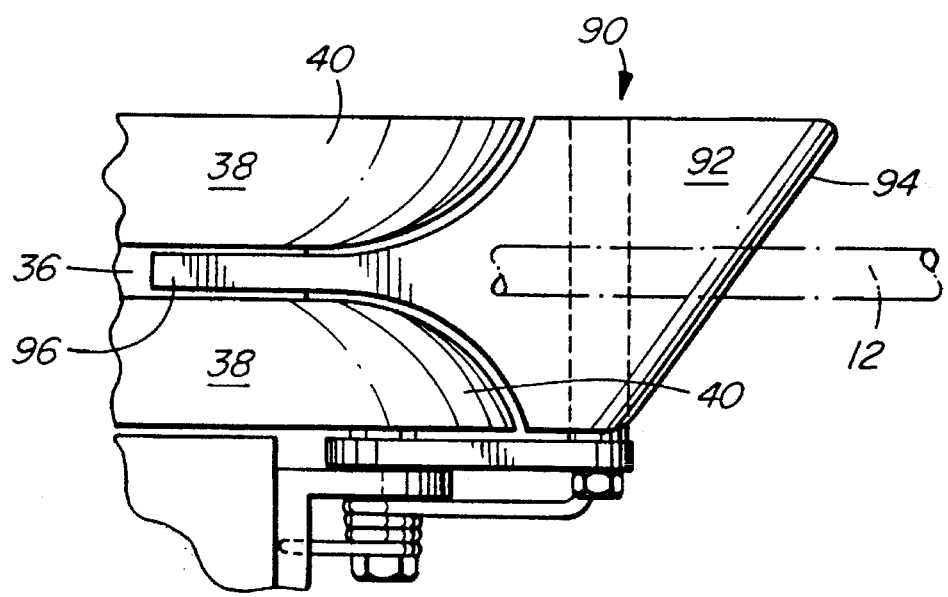
FIG. 10 shows a broken-away plan view of the deflector device of FIG. 9.

To prevent the securing devices 74 from becoming jammed in the sheave 14, a deflector device indicated generally by reference numeral 90 (FIGS. 9 and 10) is provided at the sheave 14.

The deflector device 90 has a horizontal deflector plate 92, which is positioned below the path of travel of the upper run of the rope 12 and which has an edge 94 extending at an acute angle across the path of travel of the securing devices 74. As the securing devices 74, depending from the rope 12, reach the edge 94, they are deflected laterally of the rope 12 by the deflector plate 92. This causes the securing devices 74 to be deflected away from the gap between the drive disks 38 of the sheave 14, so that the securing devices 74 ride up around the periphery of the drive disks 38, between the curved outer peripheral portions 40.

The deflector plate 92 has an elongate tail portion 96 which extends between the drive disks 38 and rests on the spacer disk 36. The deflector plate 92 is pivotally connected, by a pivot bolt 98, on one end of a lever arm 100, the opposite end of which is pivotally secured, by a pivot bolt 102, to a bracket 104, which is bolted to the reduction gearing 32. A tension spring 106, mounted on the pivot bolt 102, urges the deflector plate 92 upwardly towards the rope 12.

Figure 11:
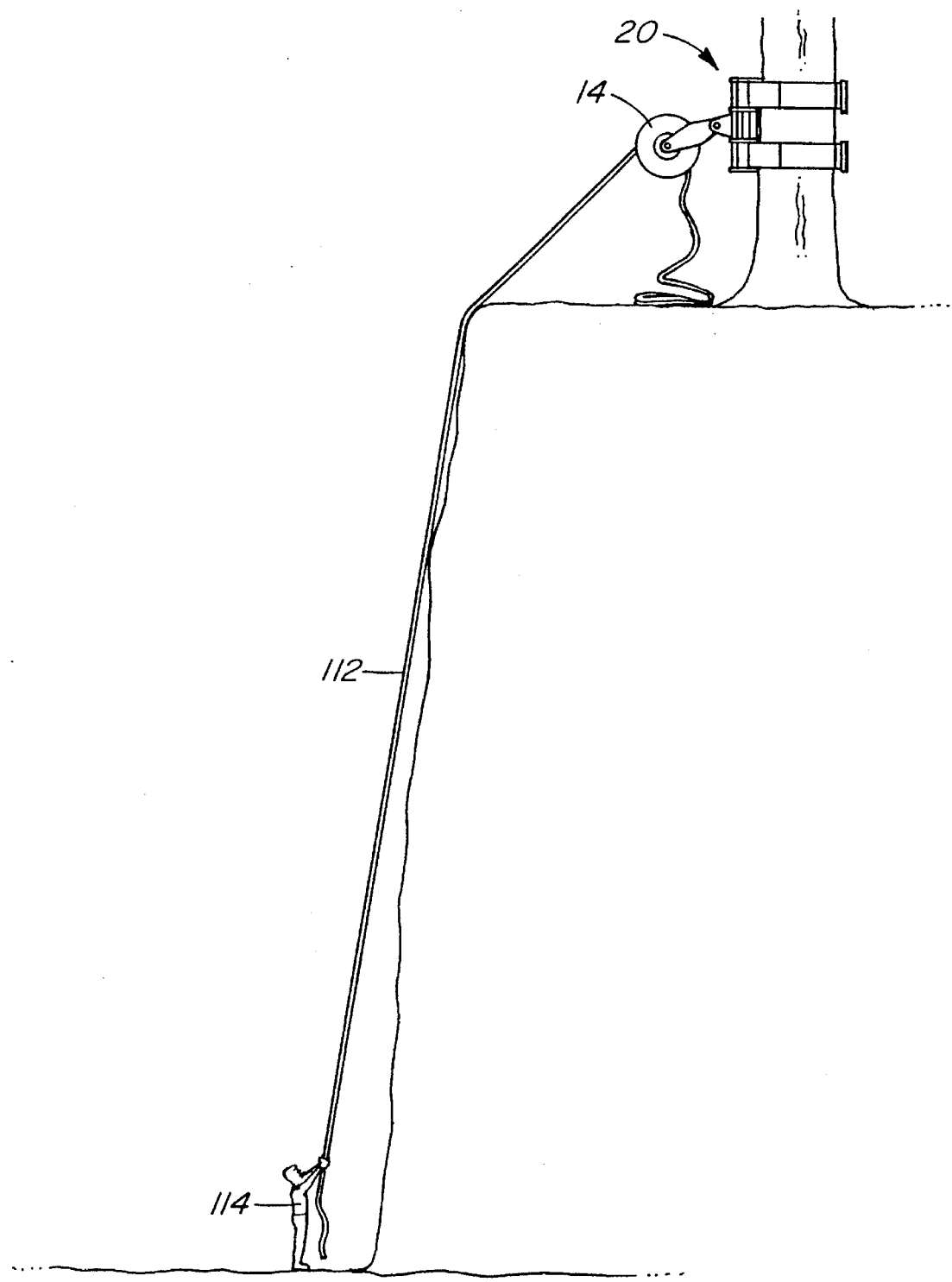
FIG. 11 shows a diagrammatic view in side elevation of a modification of the conveyor of FIGS. 1 through 10.

Instead of employing an endless rope 12, the above-described conveyor may be modified for use with a length of rope 112 (FIG. 11) having free ends. For that purpose, the snatch block 71 and the retaining device 24 are omitted, and the rope 112, collected by the sheave 14, may be collected on the ground below the sheave 14 while a person 114 is hauled up a cliff, e.g. during a rescue operation.

As will be readily apparent to those skilled in the art, various further modifications may be made to the above described embodiment of the present invention within the scope and spirit of the appended claims.

I claim:

1. A conveyor device, comprising:

a chainsaw;

a drive chain and driven disc installed on said chainsaw in place of a saw chain and bar, said drive chain being in driving engagement with said driven disc;

a reduction gearing having an input connected to said driven disc and an output;

a sheave connected to said output of said reduction gearing for rotation thereby;

a first retainer device connected to said sheave for securing said sheave to a first support;

a freely rotatable pulley;

a second retainer device carrying said pulley for securing said pulley to a second support;

an endless member extending around said sheave and said pulley; and a plurality of securing devices attached to said endless member and spaced apart along said endless member for temporarily securing objects to said endless member for conveyance thereby.

2. A conveyor device as claimed in claim 1, wherein said securing devices each comprise a fastener for engagement with one of the objects to be conveyed and a connecting portion for connecting said fastener to said rope, said connecting portion being dimensioned to pass through said sheave without being gripped thereby.

3. A conveyor device as claimed in claim 1, wherein said first retainer device comprises a first part carrying said sheave, a second part for abutment against the second support and a pivotal connection between said first and second parts, said pivotal connection comprising a vertical pivot and a horizontal pivot.

4. A conveyor device as claimed in claim 3, wherein said second part of said first retainer device has a plurality of protruding spikes for penetrating and thereby gripping the second support and a retainer strap adapted to be tightened around the second support for retaining said second part relative to the second support.

5. A conveyor device as claimed in claim 1, wherein said securing devices each comprise a spike for penetrating engagement in one of the objects and a strap connecting said spike to said endless member.

6. A conveyor device as claimed in claim 1, wherein said second retainer device comprises a pair of parallel spaced elongate members, said pulley being mounted between said elongate members for rotation about a shaft transverse to said elongate members and said elongate members projecting beyond said pulley, at one side of said pulley, so as to define therebetween a gap extending radially outwardly of said pulley, said gap being dimensioned to permit said securing devices to pass therethrough, whereby the objects are stripped from said securing devices at said pulley by said elongate members.

7. A conveyor device as claimed in claim 1, further comprising a deflector member associated with said sheave for deflecting said securing devices radially outwardly of said sheave, as said securing devices approach said sheave, said deflector member having an edge extending at an acute angle across the path of travel of said securing devices beneath said rope and adjacent said sheave.

8. A conveyor device, comprising:
a chainsaw;
a drive chain and driven disc installed on said chainsaw in place of a saw chain and bar, said drive chain being in driving engagement with said driven disc;
a reduction gearing having an input connected to said driven disc and an output;
a sheave connected to said output of said reduction gearing for rotation thereby;
a retainer device connected to said sheave for securing said sheave to a support;
a rope adapted to be engaged and pulled by said sheave; and
a plurality of securing devices attached to said rope and spaced apart along said rope for temporarily securing objects to said rope for conveyance thereby.

9. A conveyor device as claimed in claim 8, wherein said retainer device comprises a first part carrying said sheave, a second part for attachment to said support and a gimbal joint between said first and second parts.

10. A conveyor device as claimed in claim 8, further comprising a deflector member associated with said sheave for deflecting said securing devices radially outwardly of said sheave, as said securing devices approach said sheave, said deflector member having an edge extending at an acute angle across the path of travel of said securing devices beneath said rope and adjacent said sheave.

* * * * *